Nov. 16, 1965    N. IAFRATE ETAL    3,218,207
METHOD OF MAKING LEAK-PROOF CABLE
Filed Dec. 15, 1961
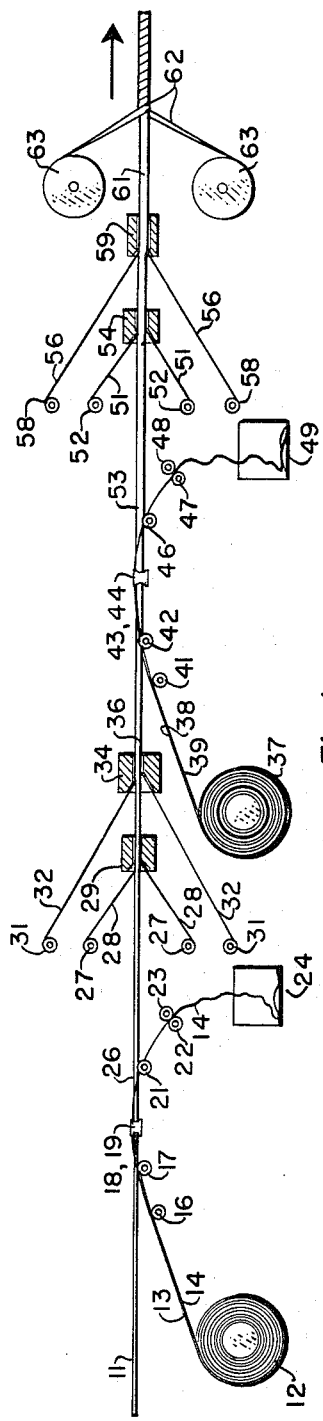
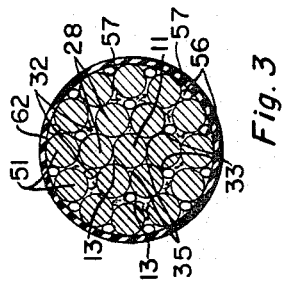
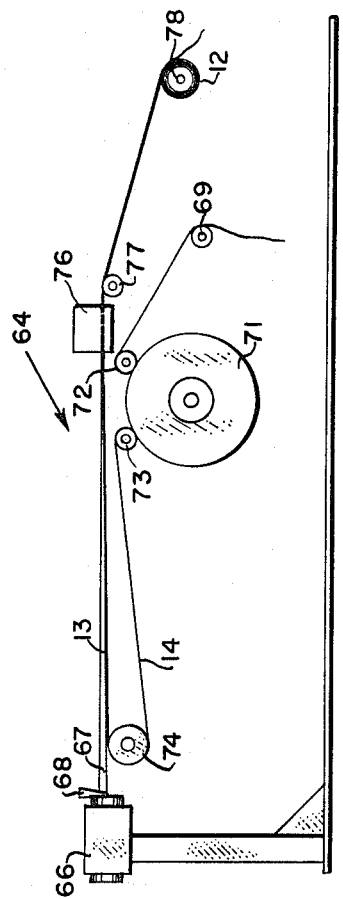
INVENTORS
NELSON IAFRATE,
SIGMUND EGE and
BY M. DAVID SCHNUR
THEIR AGENT

3,218,207
METHOD OF MAKING LEAK-PROOF CABLE
Nelson Iafrate and Sigmund Ege, Hastings on Hudson, and Martin David Schnur, New York, N.Y., assignors, by mesne assignments, to Anaconda Wire and Cable Company, a corporation of Delaware
Filed Dec. 15, 1961, Ser. No. 159,598
4 Claims. (Cl. 156—48)

Our invention relates to leak-proof cable and particularly to a method for making said cable sealed with pasty filler material.

In the manufacture of multistrand electric cables intended for passage through water-tight or vapor-proof bulkheads it is necessary to seal the cables in length-wise direction to insure the integrity of the bulkhead in the event a fluid should enter an open end of the cable or it should be severed or pierced. Although on superficial consideration this might seem an easy matter to accomplish, in actual practice no method of sealing multistrand cables with a satisfactory degree of assurance has been known. This is due, in part, to the difficulty, in any extrusion method, of forcing suitable fillers past the outer strands into the inner interstices of the cable. The problem is accentuated where the cable is of flame-retardant type or required to operate at high temperatures since this severely limits the types of material that are available for use in the construction of the cable. The methods of manufacture of high-temperature cables are also necessarily limited to methods that can be used with the high-temperature materials.

The electric cables for which the method of our invention is most advantageous comprise a plurality of layers, each layer made up of a plurality of insulated wires of circular section or of two of such wires that have been stranded to form a twisted pair. Each layer is cabled with a direction of lay opposite to its underlying layer so that there are a succession of cross-overs through which it is impossible to force a sealing compound of the proper putty-like consistency. It is also known to apply two adjacent layers with the same direction of lay and our invention is applicable to cables constructed in this manner. The fact that the cable may be subjected to excessive heating also serves to preclude the use of low viscosity compounds or compounds with very fluid constituents which might drip from the cable at high temperatures and leave it in an unsealed condition.

We have discovered that a truly leak-proof multilayer cable can be formed using a very stiff compound filler by applying compound over the cable core before the cabling of each layer and compressing the strands into the compound so that it is forced into the interstices between the strands. It is desirable to reduce the quantity of pasty filler in the cable by substituting a fibrous glass or asbestos strand and we have discovered that this can be accomplished without breaking the seal by coating the cores with sufficient filler to not only fill the interstices but extrude into the valleys, laying filler members into the valleys over the compound and passing the cable through a die to press the filler members into the compound thereby filling and sealing the valleys. The initial steps of this process may comprise extruding the compound in the form of a hollow tube, slitting it, unfolding the tube to form a flat ribbon, taking up the ribbon onto a reinforcing tape, folding the tape along with the ribbon around the cable core, and removing the tape while leaving the ribbon around the core.

A more thorough understanding of my invention may be obtained from a consideration of the appended drawing.

In the drawing:

FIGURE 1 is a diagrammatic side view of a method of making a cable in accordance with our invention.

FIGURE 2 is a diagrammatic side view of a method of preparing the filler in accordance with one embodiment of my invention.

FIGURE 3 is a sectional view of a cable made by the method of FIGURE 1.

Referring to FIGURE 1 a core 11 supplied from a source, not shown, that may be a storage reel, but may also be a processing apparatus such as a strander, extruder, etc., is advancing to the right being urged by a take-up device such as a capstan also not shown but well known in the cable making art. The core 11 may comprise a single filament such as a glass or asbestos strand or an insulated wire, or it may comprise a cable made up of a plurality of strands or pairs and may be covered with a braid or tape but in any case the core 11 has been rendered leak-proof by a suitable process where necessary, such as the process of the instant invention. A pad 12 of pasty filler compound consists of a flat ribbon 13 of the filler compound supported on a backing tape 14 and prepared in a manner hereinafter to be described. The tape 14 conveying the ribbon 13 passes over a guide roll 16 directly under the core 11 and thence to a concave roll 17 on a horizontal axis. The roll 17 initiates a fold in the tape 14 around the core 11 that is completed by a pair of concave rolls 18, 19 mounted on vertical axes on both sides of the core 11. Just beyond the rolls 18, 19 the tape 14 is separated from the ribbon 13 which remains around the core 11 and passes over a roll 21 under the urging of a pair of pinch rolls 22, 23 driven by means, not shown. From the pinch rolls 22, 23 the tape drops into a bin 24 from which it may be discarded. Beyond the roll 21 our process involves a new core 26 which is comprised of the core 11 around which the ribbon 13 has been folded. As the core 26 continues to advance, a plurality of supply reels 27 for strands 28 are rotated around it in a known manner, such as by mounting them on a planetary type of stranding machine, so as to wind the strands 28 around the core 26. The tension in the strands 28 may be controlled by known means, not shown, to imbed the strands somewhat into the compound 13 but the imbedding is completed by passing the core 26 plus the strands 28 through a die 29 that compresses the strands into the core. Rotating along with the reels 27 are a plurality of spools 31 of filler material 32 which may be an asbestos yarn or roving saturated with high-temperature varnish. The filler material 32 is laid into valleys 33 (FIGURE 3) between the strands 28 where it supplements the compound 13 that has been forced into the valleys 33. It is a feature of our method that the ribbon 13 is thick enough so that the compound will not only fill spaces or interstices 35 between the core 11 and the strands 28 and between any two adjacent strands 28 but will extrude outwardly to fill or partially fill the valleys 33 and provide a bed of compound into which the fillers 32 may be laid. Although the compound 13 is made to be as stiff as possible and still deform sufficiently to fill all irregularities in the surrounding surfaces it is not as effective as solid material such as the filler 32 for rendering a cable leak-proof since the filler is absolutely constrained against movement lengthwise of the cable and will never soften or melt at any temperature which the cable itself can withstand. The fillers 32 are forced into the valleys 33 by the passage of the core 26 through a second die 34 from which it emerges as an enlarged core 36. A second pad 37 similar to the pad 12 but made up of a ribbon of compound 38 and backing tape 39 wider than the tape 14 to compensate for the increased diameter of the core 36 over the core 11 is applied by rolls 41, 42, 43, 44 identical, except for size, to the respective rolls 16, 17, 18, 19 and the tape 39 is discarded over a roll 46 by means of pinch rolls 47, 48 into a bin 49. Thereafter another layer of strands 51 is applied from reels 52 analogous to the reels 27 over a core 53 comprised of the core 36 with the ribbon 38 of pasty compound folded around it. The strands 51 are pressed into the compound on the core 53 by a die 54 and fillers 56 are laid in valleys 57 (FIGURE 3) between the strands 51 from spools 58 and pressed into the compound within the valley by means of a die 59. It will be understood that, although we have shown two layers of compound with strands imbedded therein it is a feature of our invention that further layers may be similarly applied without sacrificing any of the leak-proof properties of our cable. Leaving the die 59 the cable is in the form of a core 61 which is covered with a binding tape 62 from pads 63 in a known manner. Hence the cable may be taken up on drums and covered with an extruded sheath of some material such as silicone rubber selected to meet the temperature requirements of the particular cable.

Referring now to FIGURE 2 a method of forming the pad 12 is indicated diagrammatically by the general numeral 64. The method of forming the pad 37 is, of course, the same. An extruder 66 extrudes a tube 67 of the pasty compound which is immediately slit lengthwise by a knife 68 and flattens out to form the ribbon 13. Meanwhile the backing tape 14 is paid from a supply pad 69 by a capstan wheel 71 to which it is held by pressure rollers 72, 73. The tape 14 passes over an idler roll 74 which guides it into position for receiving the ribbon 13. The ribbon 13, supported by the tape 14 passes through a dust box 76 where the ribbon is covered with an antisticking dust such as ground silica. The ribbon 13 supported by the tape 14 then passes over another idler roll 77 and thence to a take-up spindle 78 to form the pad 12 which may be stored until it is needed for the process shown in FIGURE 1.

We have invented a new and useful method of making leak-proof cable for which we desire an award of Letters Patent.

We claim:

1. The method of manufacturing a fluid-tight multi-strand cable comprising a core and a plurality of concentric layers of strands having interstices between said strands, comprising the steps of:
    (a) forming a sealing compound into a flat ribbon,
    (b) folding said ribbon around said core,
    (c) cabling a plurality of strands over said ribbon, and
    (d) compressing said strands into said core, thereby forcing said compound into said interstices.

2. The method of manufacturing a fluid-tight multi-strand cable comprising a core and a plurality of concentric layers of strands having interstices between said strands, comprising the steps of:
    (a) forming a sealing compound into a flat ribbon,
    (b) backing said ribbon with a reinforcing tape,
    (c) folding said tape and said ribbon around said core,
    (d) removing said tape while leaving said ribbon around said core,
    (e) cabling a plurality of strands over said ribbon, and
    (f) compressing said strands into said core, thereby forcing said compound into said interstices.

3. The method of manufacturing a fluid-tight multi-strand cable comprising a core and a layer of strands over said core, said strands having interstices between said core and said strands and a plurality of helical valleys over said strands, said method comprising the steps of:
    (a) coating a layer of stiff, putty-like sealing compound over said core,
    (b) cabling said layer of strands over said compound, said compound being sufficient to fill said interstices and at least partially fill said valleys,
    (c) compressing said strands into said compound thereby forcing said compound into said interstices and said valleys,
    (d) laying individual fibrous filler members into each of said valleys over said compound, and
    (e) passing said cable through a die so as to press said members into said compound, thereby sealing said valleys.

4. The method of manufacturing a fluid-tight multi-strand cable comprising a core and a plurality of concentric layers of strands having interstices therebetween, comprising the steps of:
    (a) extruding a sealing compound in the form of a hollow tube,
    (b) slitting said tube,
    (c) unfolding said tube to form a substantially flat ribbon,
    (d) taking up said ribbon onto a reinforcing tape,
    (e) folding said tape and said ribbon around said core,
    (f) removing said tape while leaving said ribbon around said core,
    (g) cabling a plurality of strands over said ribbon, and
    (h) compressing said strands into said core, thereby forcing said compound into said interstices.

References Cited by the Examiner
UNITED STATES PATENTS

| | | | |
|---|---|---|---|
| 2,426,904 | 9/1947 | Tunnicliff et al. | 156—54 |
| 2,427,507 | 9/1947 | Powell et al. | 156—55 |
| 2,917,217 | 12/1959 | Sisson. | |
| 3,067,804 | 12/1962 | Magner | 156—461 |

EARL M. BERGERT, *Primary Examiner.*